United States Patent
Razin

(10) Patent No.: US 8,527,638 B1
(45) Date of Patent: Sep. 3, 2013

(54) SYSTEM MANAGEMENT VIA SESSION INITIATION PROTOCOL

(75) Inventor: Sergey A. Razin, Columbia, SC (US)

(73) Assignee: EMC Corporation, Hopkinton, MA (US)

( * ) Notice: Subject to any disclaimer, the term of this patent is extended or adjusted under 35 U.S.C. 154(b) by 247 days.

(21) Appl. No.: 12/955,533

(22) Filed: Nov. 29, 2010

(51) Int. Cl.
*G06F 15/16* (2006.01)

(52) U.S. Cl.
USPC ........... 709/227; 709/218; 709/223; 709/224; 709/229; 709/245

(58) Field of Classification Search
USPC .......................... 709/218, 221, 223, 224, 227
See application file for complete search history.

(56) References Cited

U.S. PATENT DOCUMENTS

| 7,899,900 B1* | 3/2011 | Motoyama | 709/224 |
| 2010/0023609 A1* | 1/2010 | Vangala et al. | 709/221 |
| 2010/0217837 A1* | 8/2010 | Ansari et al. | 709/218 |

OTHER PUBLICATIONS

"Understanding SIP. Today's Hottest Communications Protocol Comes of Age," Ubiquity, White Paper.

* cited by examiner

*Primary Examiner* — Yves Dalencourt
(74) *Attorney, Agent, or Firm* — BainwoodHuang

(57) ABSTRACT

A Session Initiation Protocol (SIP) proxy device associated with a computer system is configured to provide a management device with the ability to manage a computer system using the Session Initiation Protocol. Because SIP is a standard communication protocol, a system manager can configure both a management device and a system component of the computer system to communicate with each other while minimizing integration issues. Additionally, SIP provides bidirectional communication between the management device and the system component that allows the system manager to request and receive real-time computer system status as well as associated presence information when managing the computer system. Furthermore, SIP can be configured as a secure communication protocol that encrypts communications exchanged between two or more devices, thereby allowing the system manager to securely manage and obtain computer system status independent of the manager's physical or geographic location.

19 Claims, 4 Drawing Sheets

SYSTEM MANAGEMENT VIA SESSION INITIATION PROTOCOL

BACKGROUND

A typical data storage system stores data for one or more external client devices. Conventional data storage systems typically include a storage processor and an array of disk drives electrically attached to the storage processor. The storage processor includes one or more ports, such as fibre channel ports, that allow the client devices to connect to the storage processor and is typically configured to perform load and store operations on the array of disk drives on behalf of the client devices. Conventional data storage systems also allow a management device to manage, monitor, and configure the data storage system according to a system manager's needs. For example, the management device can execute a management device application to remotely manage and monitor a corresponding data storage system across a network.

SUMMARY

While conventional management devices provide a system manager with the ability to remotely access and manage the data storage system, conventional management devices can access the data storage system only through two separate mechanisms.

For example, a conventional data storage system provides a graphical user interface (GUI) that allows a user or system manager to access the storage system via a management device, such as a computer workstation connected to the data storage system, within an enterprise. To access the GUI, the system manager launches a web-based browser on the management device. The management device displays the GUI which includes a variety of objects that represent various components of the data storage system. To manage the data storage system, the system manager interacts with the displayed objects using a mouse or keyboard.

While the data storage system GUI allows the system manager to manage various aspects of the data storage system within an enterprise by a web browser, the use of conventional data storage system GUIs can suffer from a variety of deficiencies. For example, because of security issues, a system manager's web-based access to the GUI is typically limited to inter-enterprise access. As such, the system manager is not permitted to remotely access the data storage system outside of the enterprise, such as via an external port. Additionally, data storage system GUIs require that a proprietary plug-in, such as JAVA or FLASH, be installed as part of the management device or workstation. However, in certain cases, the operating system used by the management device may be incompatible with the plug-in. For example, certain mobile devices, such as smart phones, are not configured to easily execute proprietary plug-ins, such as FLASH. Accordingly, because of the incompatibility, a system manager cannot easily manage a data storage system by accessing the data storage system's GUI using particular mobile devices.

In another example, a conventional data storage system allows a system manager to access and manage the system using a command line interface (CLI), a text-only interface, within an enterprise. However, CLI protocols are typically vendor proprietary and vendor specific. Because a common CLI protocol does not exist, management devices, such as smart phones, are incompatible with the CLI protocols of one or more vendors and cannot be integrated with the data storage system. Furthermore, because of security issues, a best-practice implementation of various CLI protocols would not allow a system manager the ability to access the data storage system remotely outside of the enterprise.

By contrast to conventional approaches, embodiments of the present invention relate to system management via Session Initiation Protocol (SIP). SIP is a standard signaling protocol that is configured to allow the exchange of communications between two or more devices across a wide variety of network capable technologies. Because SIP is a standard communication protocol, as opposed to a proprietary or vendor specific protocol, a system manager can configure both a mobile device, such as a smart phone, and a computer system, such as a data storage system or an alarm system to communicate with each other while minimizing integration issues. Additionally, SIP provides bidirectional communication between the mobile device and the computer system. Such bidirectional communication allows the system manager to request and receive real-time computer system status as well as associated presence information when managing the system. Furthermore, SIP can be configured as a secure communication protocol that encrypts communications exchanged between two or more devices. By utilizing secured SIP as a transport protocol between the mobile device and the computer system, the system manager can securely manage and obtain computer system status information external to an enterprise and independent of the manager's physical or geographic location.

In a Session Initiation Protocol (SIP) proxy device associated with a computer system, one embodiment is directed to a method for providing system management. The method includes receiving, by the SIP proxy device and in an SIP format, a system management command from a management device, the management device configured to manage a system component of the computer system. The method includes confirming, by the SIP proxy device, an association between the management device and the system component of the computer system. The method includes, in response to confirming the association between the mobile device and the system component of the computer system, providing, by the SIP proxy device, a system management response to the management device in the SIP format.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present invention relate to system management via Session Initiation Protocol (SIP). SIP is a standard signaling protocol, typically used by telecommunication devices, that is configured to allow the exchange of communications between two or more devices across a wide variety of network capable technologies. Because SIP is a standard communication protocol, as opposed to a proprietary or vendor specific protocol, a system manager can configure both a management device, such as a smart phone, and a computer system, such as a data storage system or an alarm system, to communicate with each other while minimizing integration issues. Additionally, SIP provides bidirectional communication between the mobile device and the computer system. Such bidirectional communication allows the system manager to request and receive real-time computer system status as well as associated presence information when managing the system. Furthermore, SIP can be configured as a secure communication protocol that encrypts communications exchanged between two or more devices. By utilizing secured SIP as a transport protocol between the mobile device and the computer system, the system manager can securely manage and obtain system status the computer system external to an enterprise and independent of the manager's physical or geographic location.

Figure 1:
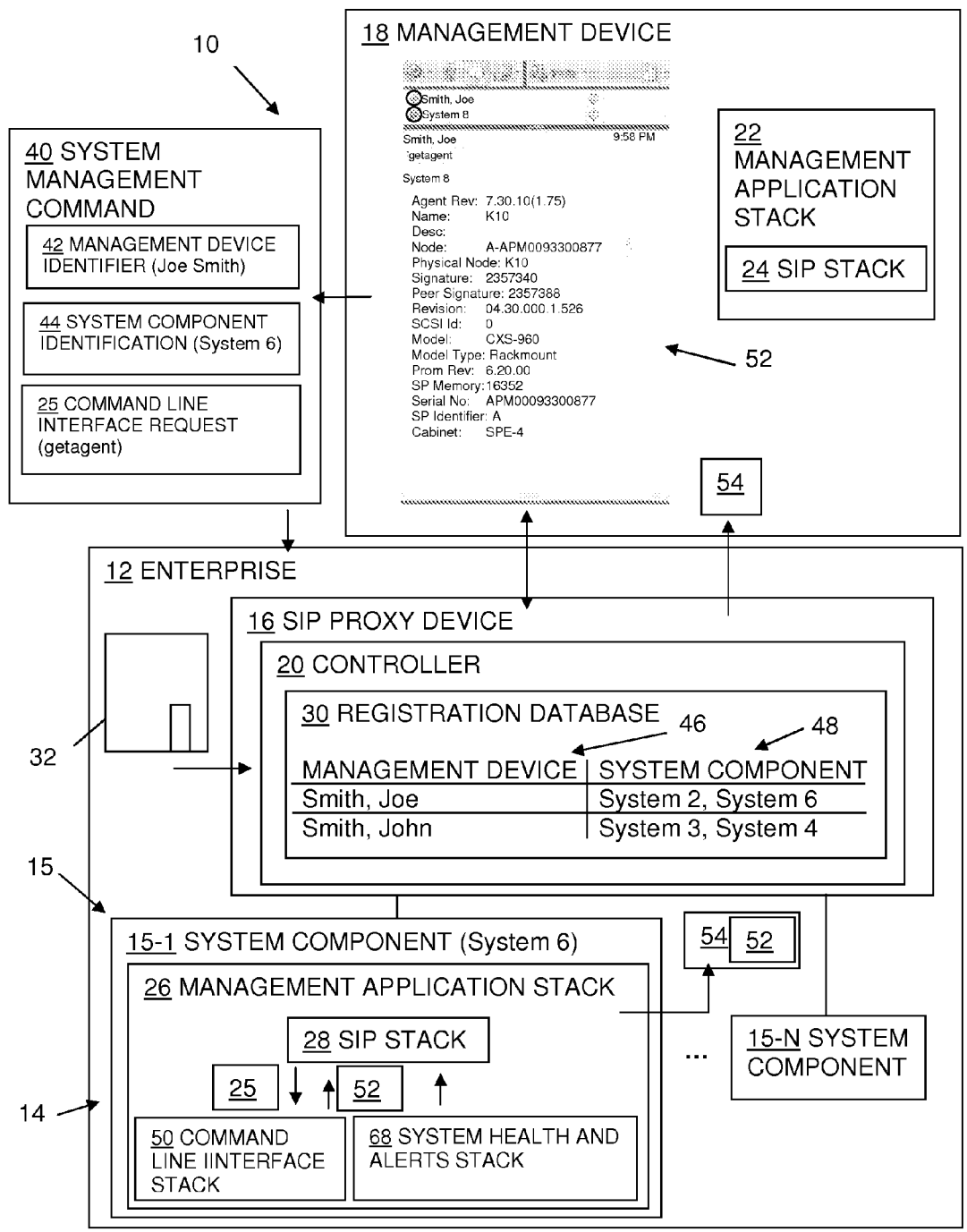
FIG. 1 illustrates a schematic representation of a computer system and associated management device, according to one embodiment.

FIG. 1 illustrates an example arrangement of a computer system 10 such as used by an enterprise 12. The computer system 10 includes a set of system components 14 disposed in electrical communication with an SIP proxy device 16, such as through a network connection. As illustrated, the set of system components 14 and the SIP proxy device 16 are disposed within the enterprise 12, such as a building housing a business. The computer system 10 also includes a management device 18 configured to exchange information with the SIP proxy device 16 regarding one or more system components 15 of the set of system components 14. In one arrangement, as illustrated, the management device 18 can be disposed external to the enterprise 12 at a location remote from the SIP proxy device 16 and set of system components 14.

The management device 18 is configured to exchange SIP-formatted messages with one or more of the system components 15 via the SIP proxy device 16. In one arrangement, the management device 18 includes a management application stack 22 having an associated SIP stack 24 configured to either convert text messages into SIP format or extract text messages from an SIP format. For example, in the case where a user directs the management device 18 to transmit a system management command, such as a command line interface request, to a system component 15, the SIP stack 24 incorporates a system management command as part of an SIP packet prior to transmission to the SIP proxy device 16.

While the management device 18 can be configured in a variety of ways, in one arrangement, the management device 18 is configured as a mobile device disposed at a geographic location external to the enterprise 12. For example, the management device 18 can be a laptop computer or a smart phone which provides a user with both telephonic functionality and computer-associated communication functionality, such as the ability to compose, send, and receive emails, compose and edit electronic documents. When configured as a mobile device, the management device 18 allows a system manager to securely monitor and manage one or more system components 15 outside of the confines of the enterprise 12, thereby making system management easier and more efficient for the system manager. Alternately, the management device 18 can be configured as a computerized device located within the enterprise 12.

The set of system components 14 are configured to exchange SIP-formatted messages with the management device 18 via the SIP proxy device 16. In one arrangement, each system component 15 includes a management application stack 26 having an associated SIP stack 28 configured to either convert text messages into SIP format or extract text messages from an SIP format. For example, in response to receiving the system management command from the management device 18 via the SIP proxy device 16, the SIP stack 28 of a receiving system component 15 incorporates a system management response as part of an SIP packet prior to transmission to the SIP proxy device 16.

While each system component 15 of the set of system components 14 can be configured in a variety of ways, in one arrangement, each system component 15 is configured as a data storage system having a storage processor and one or more disk enclosures electrically attached to the storage processor. Each of the disk enclosures associated with each system component 15 can include an array of magnetic memory units, such as disk drives or flash drives, with the storage processor being configured to perform load and store operations on the magnetic memory units of the disk enclosures on behalf of a client device (not shown).

The SIP proxy device 16 is disposed at a front end of the set of system components 14 and is configured to allow the management device 18 to manage one or more system components 15 within the enterprise 12 based upon a preconfigured association between the management device 18 and the system component 15. In one arrangement, the SIP proxy device 16 includes a controller 20, such as a memory and a processor, configured with registration information, such as part of a registration database 30, which associates the management device 18 with particular system components 15. For example, a system manager can register or subscribe the management device 18 with one or more system components 15, such as system components 15-1 through 15-N. Based upon the registration, the SIP proxy device 16 then stores a logical association between the management device 18 and the registered system components 15-1 through 15-N in a registration database 30. For example, as illustrated in FIG. 1, the SIP proxy device 16 stores as part of the registration database 30 an association between a management device 18 identified as "Smith, Joe" and system components 15 identified as "System 2" and "System 6." As will be described below, the SIP proxy device 16 utilizes the registration database 30 to manage communications between the management device 18 and the system components 15.

With such a configuration of the SIP proxy device 16, the management device 18 is not required to store information regarding the location or addresses of the system components 15. Instead, the management device 18 is configured with the address of the SIP proxy device 16 which, in turn, maintains the associations between the management device 18 and the system components 15. Accordingly, the SIP proxy device 16 provides a level of security to the communications exchanged between the management device 18 and the system components 15.

In one arrangement, the controller 20 of the SIP proxy device 16 stores an application for managing communication between the management device 18 and the set of system components 14. The communication management application installs on the controller 20 from a computer program product 32. In some arrangements, the computer program product 32 is available in a standard off-the-shelf form such as a shrink wrap package (e.g., CD-ROMs, diskettes, tapes, etc.). In other arrangements, the computer program product 32 is available in a different form, such downloadable online media. When performed on the controller 20 of the SIP proxy device 16, the communication management application causes the SIP proxy device 16 to manage communication between the management device 18 and the set of system components 14.

Figure 2:
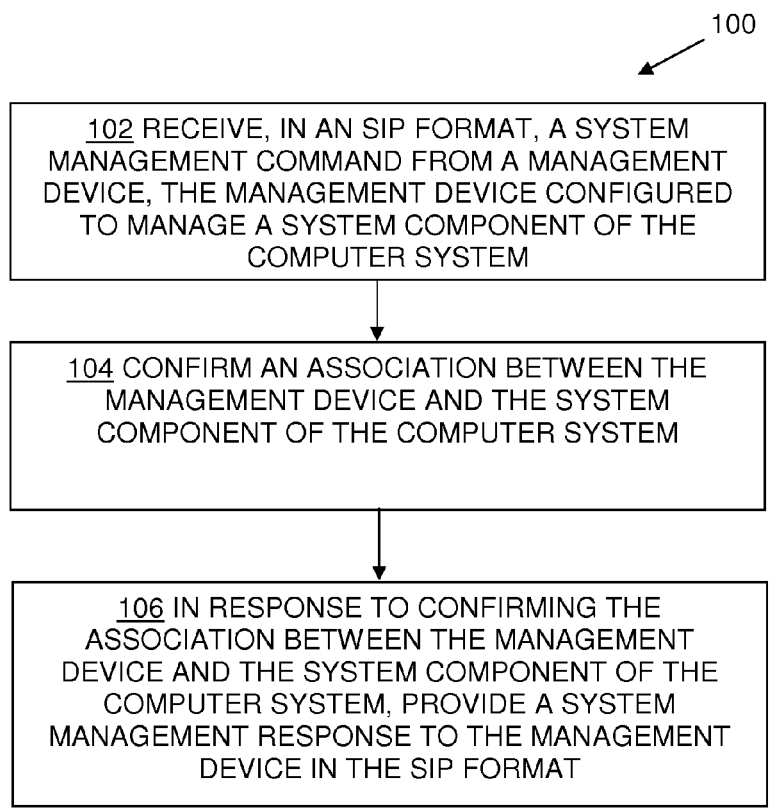
FIG. 2 is a flowchart that illustrates a procedure performed by an SIP proxy device of the computer system of FIG. 1.

FIG. 2 is a flowchart 100 that illustrates a procedure performed by the SIP proxy device 16 when managing communication between the management device 18 and the set of system components 14.

In step 102, the SIP proxy device 16 receives, in an SIP format, a system management command from a management device 18, the management device 18 configured to manage a system component 15. For example, with reference to FIG. 1, assume the management device 18 is configured as a mobile management device (e.g., a smart phone) disposed at a geographic location external to the enterprise 12. Further assume that the management device 18 receives an instruction from a system manager to transmit a system management command 25, such as the command line interface (CLI) request "getagent," to system component 15-1, identified as System 6 by the management device 18. The management device 18 forwards the command 25 through the SIP stack 24 which incorporates the request as part of an SIP packet or SIP formatted system management command 40. The management device 18 then transmits the command 40 in the SIP format, such as using an Instant Messenger (IM) application, to the SIP proxy device 16 via a wireless network connection. In turn, the SIP proxy device 16 receives the request 40 from the management device 18 as the system management command.

Returning to FIG. 2, in step 104, the SIP proxy device 16 confirms an association between the management device 18 and the system component 15-1 of the computer system 10. While the SIP proxy device 16 can perform the confirmation in a variety of ways, in one arrangement, the SIP proxy device 16 utilizes the registration database 30 to confirm that the management device 18 is configured to manage the system component 15-1.

For example, with reference to FIG. 1, the system management command 40, as transmitted from the management device 18 can include a management device identifier 42, such as a tag that provides the identity of the management device 18, in this case "Joe Smith." The system management command can also include a system component identifier 44, such as the identity of the system component 15 to be managed, in this case "System 6." When the SIP proxy device 16 receives the system management command 40, the SIP proxy device 16 is configured to detect the presence of, and identify, the management device identifier 42 and the system component identifier 44 associated with the system management command 40.

Once the SIP proxy device 16 has identified the management device identifier 42 and the system component identifier 44 of the system management command 40, the SIP proxy device 16 detects a correspondence between the management device identifier 44 and a management device entry 46 in the registration database 30. For example, as indicated above, the management device identifier 44 identifies the requesting management device 18 as "Joe Smith." Based upon a review of the registration database 30, the SIP proxy device 16 detects the management device 18 identified as "Joe Smith" as being registered with the SIP proxy device 16 and as such detects a correspondence between the system component identifier 44 of the system management command 40 and a management device entry 46 in the registration database 30.

After the SIP proxy device 16 has confirmed that the management device 18 identified as "Joe Smith" is registered as part of the registration database 30, the SIP proxy device 16 detects a correspondence between the system component identifier 44 and a system component entry 48 in the registration database 30 associated with the previously identified management device entry 46. For example, as indicated above, the system component identifier 44 identifies the system component 15 targeted for management by the management device as "System 6" (i.e., system component 15-1 of FIG. 1). Accordingly, for the management device entry "Joe Smith," the SIP proxy device 16 reviews the associated system component entry 48 to detect the presence of the system component identified as "System 6." Because the system component entry 48 for management device "Joe Smith" includes the system component 15-1 "System 6" as identified by the system component identifier 44, the SIP proxy device 16 detects a correspondence between the system component identifier 44 and a system component entry 48 in the registration database 30.

In response to detecting a correspondence between the management device identifier 42 and a management device entry 46 in the registration database 30, as well as the presence of a system component entry 48 identified by the system component identifier 44, the SIP proxy device 16 forwards the system management command 40, in the SIP format, to the identified system component 15-1 of the computer system 10. For example, as illustrated in FIG. 1, the SIP proxy device 16 forwards the system management command 40 to the SIP stack 28 of the management application stack 26 associated with the system component 15-1. The SIP stack 28 of the system component 15-1 extracts the CLI request "getagent" 25 from the SIP formatted system management command 40 and forwards the CLI request 25 to a command line interface component or stack 50. In response to receiving the CLI request 25, the command line interface stack 50 retrieves an appropriate command line response 52, such as agent information, from the system component 15-1 and forwards the command line response 52 to the SIP stack 28 which incorporates the response as part of an SIP packet or SIP formatted system management response 54. Once configured in the SIP format, the system component 15-1 forwards the SIP formatted system management response 54 to the SIP proxy device 16, such as via a network connection within the enterprise 12.

Returning to FIG. 2, in step 106, in response to confirming the association between the management device 18 and the system component 15-1 of the computer system 10, the SIP proxy device 16 provides a system management response 54 to the management device 18 in the SIP format. For example, with reference to FIG. 1, the SIP proxy device 16 provides the SIP formatted system management response 54 to the Instant Messenger (IM) application via a wireless network connection. After the management device 18 has received the system management response 54, the management device 18 forwards the system management response 54 to the SIP stack 24 to extract the command line response 52 which is subsequently displayed by the management device 18. With such a display, the management device 18 allows system manager to immediately review the response 52 and take real-time action, based upon response 52, if needed.

As indicated above, SIP is a standard communication protocol that allows devices to communicate with each other while minimizing software integration issues among the devices. With respect to the computer system 10 above, the management device 18 and the system components 15 are configured to exchange messages in the SIP format via the SIP proxy device 16. By utilizing SIP as the transport protocol between the management device 18 and the system components 15, a system manager can manage and obtain the status of the system components 15 independent of physical location of the management device, such as a mobile telecommunications device, and without requiring configuration of the device 18 or the components 15 with proprietary communication applications. Additionally, because the SIP proxy device 16 facilitates the exchange of SIP packets between the management device 18 and the system components 15, the management device 18 is not required to store information relating to either the address or location of the system components 15. Furthermore, the SIP format allows for authentication between the management device 18 and the SIP proxy 16. Based upon authentication of credentials provided by the management device 18 via the SIP format, the SIP proxy 16 can either allow or disallow the management device 18 to communicate with a particular system component 15. Accordingly, by maintaining the privacy of the address and location of the system components, the SIP proxy device 16 adds a level of security to the computer system 10, particularly when the management device 18 is disposed at a geographic location external to the enterprise 12.

Figure 3:
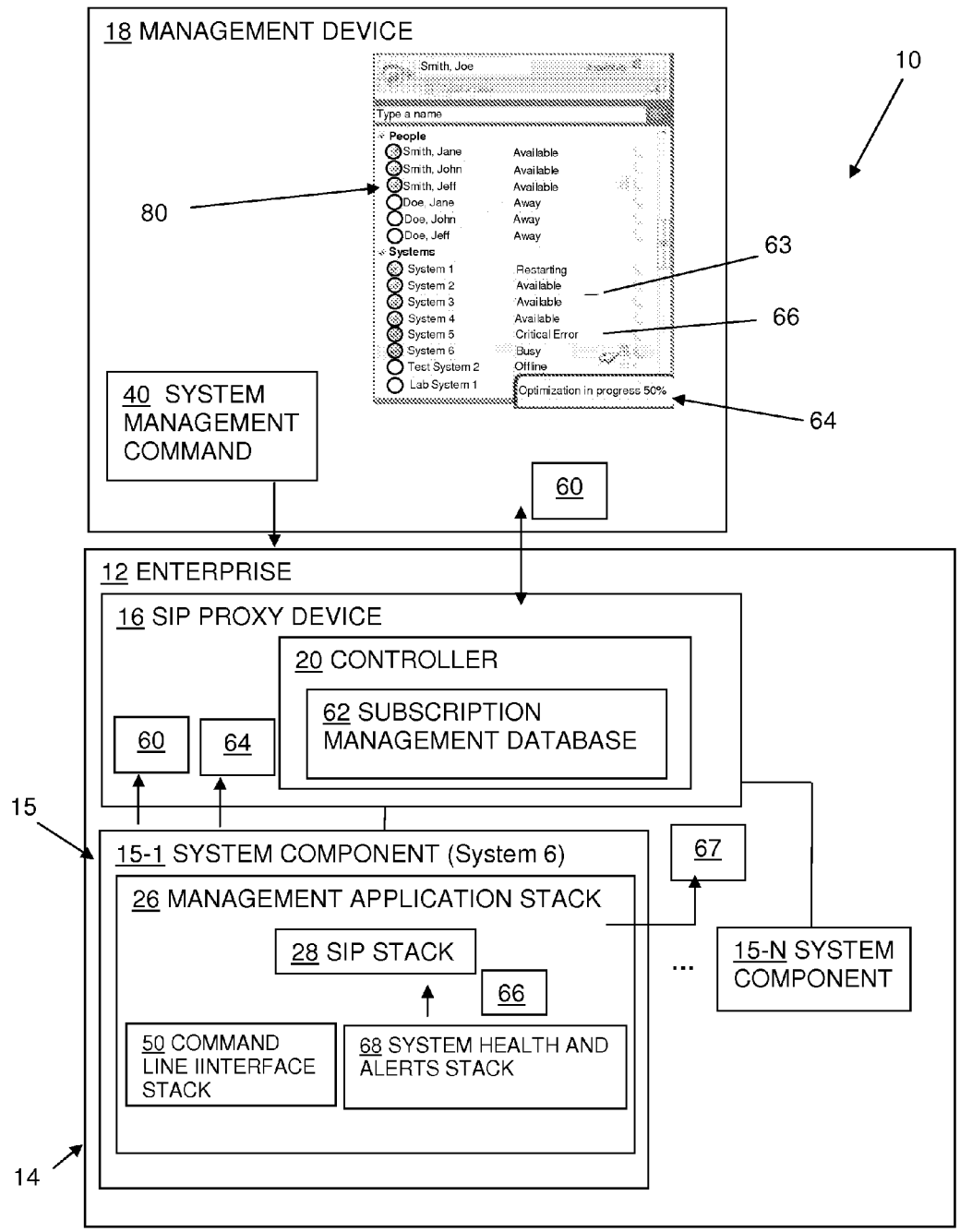
FIG. 3 illustrates a schematic representation of the SIP proxy device providing presence information to the management device of FIG. 1, according to one embodiment.

In addition to managing communication between the management device 18 and the system components 15, in one arrangement, the SIP proxy device 16 is configured to retrieve and provide the management device 18 with additional information regarding the system components 15 of the computer system 10. In one arrangement, as illustrated in FIG. 3, the SIP proxy device 16 can provide the management device 18 with presence information 60 indicative of the status of one of more system components 15 to allow the management device 18 to more efficiently manage the system components 15.

Prior to providing presence information to the management device 18, the SIP proxy device 16 first receives presence information 60 from the system components 15. For example, in the case where a system component 15, such as system component 15-1, changes operation status, such as by coming online or transitioning from an available to an unavailable state, the system component 15-1 transmits the real-time status information as presence information 60 to the SIP proxy device 16. After having received the presence information 60, the SIP proxy device 16 detects if the management device 18 has subscribed to the presence information 60 for the system component 15-1. For example, the SIP proxy device 16 reviews a subscription database 62 that list the management device subscribers 18 for each system component 15 of the computer system 10.

In the case where the SIP proxy device 16 detects that the management device 18 has subscribed to the presence information 60 from the system components 15, the SIP proxy device 16 forwards the presence information 60 to the management device 18. Once received, the management device 18 displays the presence information 60 as status information 63 indicating the availability (e.g., whether available, restarting, busy, offline, etc.) of each system component 15 to receive system management commands 40. Based upon the display of the status information 63, the system manager can select a particular system component 15 for management and forward a system management command 40 to the selected system component via the SIP proxy device 16. For example, in the case where the status information 63 indicates the system component 15-1 as being offline, the system manager can transmit a system management command 40 having a CLI component 25 to allow the system manager to troubleshoot system component 15-1.

As indicated above, the presence information 60 can indicate the status of one of more system components 15 of the computer system 10 after the system component 15 has transitioned from one state to another (e.g., active to inactive). In one arrangement, the presence information 60 is configured as dynamic presence information 64 that indicates the real-time status of one of more system components 15 of the computer system 10 while a system component 15 transitions from one state to another. For example, as illustrated in FIG. 3, the SIP proxy device 16 receives, as the dynamic presence information 64, changes in a system component's status as the changes occur, such as the progress of disk optimization of the system component 15. The SIP proxy device 16 provides the dynamic presence information 64 to the management device 18 which, in turn, displays the dynamic presence information 64. With such display, the management device 18 provides the system manager with real-time information regarding ongoing changes to any of the system components 15 during operation, thereby allowing the system manager to act accordingly.

In another arrangement, the presence information 60 is configured as alert information 67 associated with a system component 15 of the computer system 10 and provided to the management device 18 in SIP format. For example, with reference to FIG. 3, the management application stack 26 of each system component 15 (i.e., system component 15-1 in this case) includes a system health and alerts component or stack 68 configured to generate error messages 66 based upon errors encountered by the system component 15 during operation. As the health and alerts stack 68 generates error messages 66, the SIP stack 28 receives the error messages 66 and incorporates the error messages 66 as part of an SIP alert information packet 67 prior to transmission to the SIP proxy device 16. After having received the alert information 67 in SIP format, the SIP proxy device 16 provides the alert information 67 to the management device 18 which, in turn, extracts the error messages 66 and displays the error messages 66 for review by the system manager. With such display, the management device 18 provides the system manager with real-time information regarding the system components 15 during operation, thereby allowing the system manager to intervene, in real time, if necessary.

Figure 4:
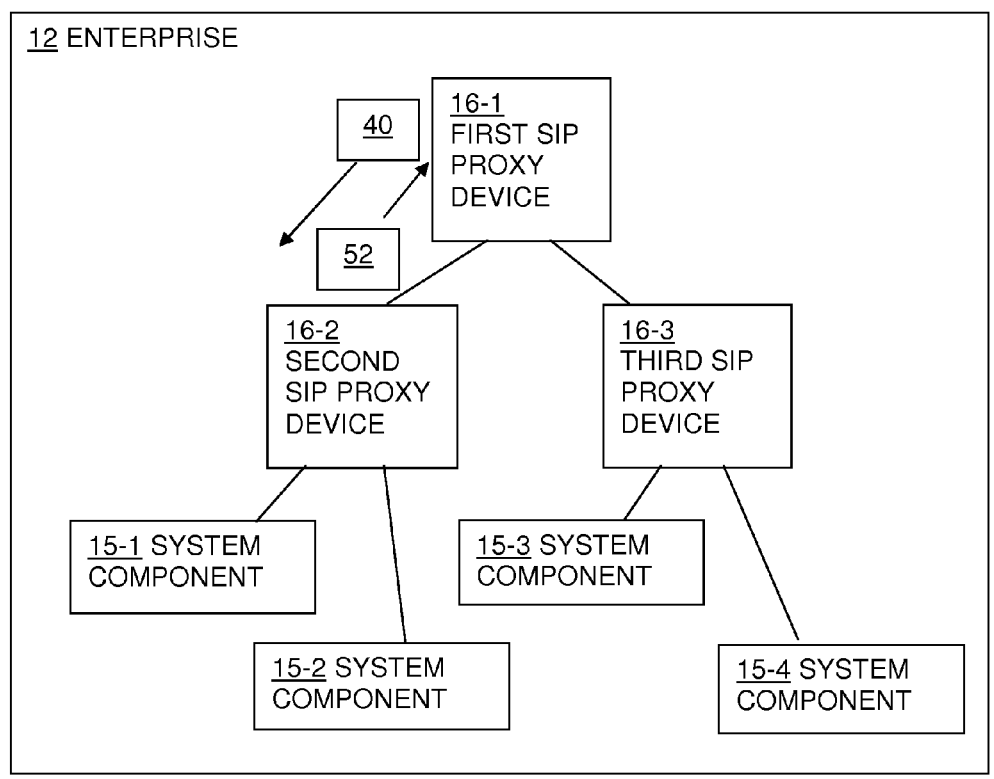
FIG. 4 illustrates a hierarchical arrangement of a plurality of SIP proxy devices and system components, according to one embodiment

As indicated above, as the SIP proxy device 16 facilitates the exchange of SIP packets between the management device 18 and the system components 15, the SIP proxy device 16 aids in maintaining the privacy of the address and location information of the system components 15, thereby adding a degree of security to the computer system 10. In one arrangement, and with reference to FIG. 4, multiple SIP proxy devices 16-1 through 16-3 are arranged in a hierarchical manner to further hide the address and location information of the associated system components 15-1 through 15-4.

For example, as illustrated, an enterprise includes a first SIP proxy device 16-1, a second SIP proxy device 16-2, and a third SIP proxy device 16-3 where the second and third SIP proxy devices 16-2, 16-3 are disposed in electrical communication with, and hierarchically arranged beneath, the first SIP proxy device 16-1. As illustrated, each of the second and third SIP proxy devices 16-2, 16-3 include system components 15-1, 15-2 and 15-3, 15-4, respectively.

During operation, as the first SIP proxy device 16-1 receives a system management command 40 from the management device, the first SIP proxy device 16-1 detects a correspondence between the system management command 40 and one of the second or third SIP proxy devices 16-2, 16-3. For example, the first SIP proxy device 16-1 can review a registration database 30, such as described above to determine which, if either, of the second or third SIP proxy devices 16-2, 16-3 is associated with the system management command 40. In the case where the first SIP proxy device 16-1 detects that the system management command 40 is directed toward the second SIP proxy device 16-2, the first SIP proxy device 16-1 transmits the system management command 40 to the second SIP proxy device for delivery to a system component 15-1, 15-2. In response, the first SIP proxy device 16-1 receives a system management response 52 from the second SIP proxy device 16-2 and transmits the system management response 52 to the management device 18.

Because the second and third SIP proxy devices 16-2, 16-3 are hierarchically arranged below the first SIP proxy device 16-1, the second and third SIP proxy devices 16-2, 16-3 place an additional communications layer between the first SIP proxy device and the system components 15, thereby minimizing erroneous release of address or location information related to the system components 15 outside of the enterprise 12.

While various embodiments of the invention have been particularly shown and described, it will be understood by those skilled in the art that various changes in form and details may be made therein without departing from the spirit and scope of the invention as defined by the appended claims.

For example, as indicated above, the SIP proxy device 16 is configured to exchange communications between the management device 18 and the system components 15 in an SIP format. Such indication is by way of example only. In one arrangement, the SIP proxy device 16 is configured to exchange communications between the management device 18 and the system components 15 in a secure SIP format. With such a secure SIP format, SIP formatted communications between the management device 18 and the system components 15 are further encrypted to provide an additional level of security to the communication exchange.

Also, while FIG. 1 illustrates the computer system 10 as having a single management device 18, it should be noted that any number of management devices 18 can be configured to communicate with the SIP proxy device 16 in the SIP format. In one arrangement, and with reference to FIG. 3, when multiple management devices 18 electrically communicate with a common SIP proxy device 16, the SIP proxy device 16 is configured to provide presence information 80 to each management device 18, indicating the identity of every management device to every other management device 18. In one arrangement, while each of the management devices 18 are aware of the presence of other management devices on the SIP proxy device 16, the management devices do not have direct access to each other. Accordingly, a first management device cannot interfere with or monitor SIP communications between a second management device and the SIP proxy device.

What is claimed is:

1. In a Session Initiation Protocol (SIP) proxy device associated with a computer system, a method for providing system management, comprising:
receiving, by the SIP proxy device and in a SIP format, a system management command from a management device, the management device configured to manage a system component of the computer system;
confirming, by the SIP proxy device, an association between the management device and the system component of the computer system; and
in response to confirming the association between the management device and the system component of the computer system, providing, by the SIP proxy device, a system management response to the management device in the SIP format;
wherein receiving the system management command from the management device comprises receiving, by a first SIP proxy device and in the SIP format, the system management command from a management device and further comprising:
detecting, by the first SIP proxy device, a correspondence between the system management command and a second SIP proxy device disposed in electrical communication with the first SIP proxy device, the second SIP proxy device being arranged hierarchically beneath the first SIP proxy device;
transmitting, by the first SIP proxy device and in the SIP format, the system management command to the second SIP proxy device;
receiving, by the first SIP proxy device and in the SIP format, the system management response from the second SIP proxy device; and
transmitting, by the first SIP proxy device and in the SIP format, the system management response to the management device.

2. The method of claim 1, wherein confirming the association between the management device and the system component of the computer system comprises:
detecting, by the SIP proxy device, a management device identifier and a system component identifier associated with the system management command received from the management device;
detecting a correspondence, by the SIP proxy device, between the management device identifier and an entry in a registration database associated with the system component, the system component being identified by the system component identifier;
in response to detecting a correspondence between the management device identifier and an entry in the registration database forwarding, by the SIP proxy device and in the SIP format, the system management command to the system component of the computer system; and
receiving, by the SIP proxy device and in the SIP format, the system management response from the system component of the computer system.

3. The method of claim 1, comprising:
receiving, by the SIP proxy device, presence information related to at least one system component of the computer system, the presence information indicating a status of the at least one system component of the computer system;
transmitting, by the SIP proxy device and in the SIP format, the presence information to the management device associated with the computer system, the management device having subscribed to the presence information associated with the at least one system component of the computer system; and
wherein receiving the system management command from the management device comprises receiving, by the SIP proxy device and in the SIP format, the system management command from the management device, the system management command targeted toward a selected system component of the at least one system component, the management device having selected the system component based upon the presence information indicating the status of the selected system component.

4. The method of claim 3, wherein receiving presence information related to the at least one system component of the computer system, the presence information indicating a status of the at least one system component of the computer system comprises receiving, by the SIP proxy device, dynamic presence information related to at least one system component of the computer system, the dynamic presence information indicating a substantially real-time status of the at least one system component of the computer system.

5. The method of claim 1, comprising:
receiving, by the SIP proxy device, presence information related to at least one system component of the computer system, the presence information including alert information associated with at least one system component of the computer system;
transmitting, by the SIP proxy device and in the SIP format, the presence information to the management device associated with the computer system, the management device having subscribed to the presence information associated with the at least one system component of the computer system; and
wherein receiving the system management command from the management device comprises receiving, by the SIP proxy device and in the SIP format, the system management command from the management device, the system management command targeted toward a selected system component of the at least one system component, the management device having selected the system component based upon the alert information associated with the presence information of the selected system component.

6. The method of claim 1, wherein receiving a system management command from a management device comprises receiving, by the SIP proxy device and in the SIP format, the system management command from a mobile management device located at a geographic location external to an enterprise associated with the computer system, the mobile management command configured to manage the system component of the computer system.

7. The method of claim 6, wherein the management device is a smart phone configured to provide both telephonic functionality and computer-associated communication functionality.

8. The method of claim 1, wherein:
receiving the system management command from the management device comprises receiving, by the SIP proxy device and in the SIP format, the system management command from the management device, the system management command configured as an SIP message having a command line interface (CLI) management request; and
providing the system management response to the management device in the SIP format comprises providing, by the SIP proxy device and in the SIP format, the system management response to the management device, the system management response configured as an SIP message having a CLI management response.

9. A Session Initiation Protocol (SIP) proxy device, comprising:
at least one communications interface; and
a controller electrically coupled to the at least one communications interface wherein the controller is configured to:
receive, in a SIP format, a system management command from a management device, the management device configured to manage a system component of the computer system;
confirm an association between the management device and the system component of the computer system; and
in response to confirming the association between the management device and the system component of the computer system, provide a system management response to the management device in the SIP format,
wherein the SIP proxy device is configured as a first SIP proxy device and in the SIP format, the controller of the first SIP proxy device configured to:
detect a correspondence between the system management command and a second SIP proxy device disposed in electrical communication with the first SIP proxy device, the second SIP proxy device being arranged hierarchically beneath the first SIP proxy device;
transmit, in the SIP format, the system management command to the second SIP proxy device;
receive, in the SIP format, the system management response from the second SIP proxy device; and
transmit, in the SIP format, the system management response to the management device.

10. The SIP proxy device of claim 9, wherein, when confirming the association between the management device and the system component of the computer system, the controller is configured to:
detect a management device identifier and a system component identifier associated with the system management command received from the management device;
detect a correspondence between the management device identifier and an entry in a registration database associated with the system component, the system component being identified by the system component identifier;
in response to detecting a correspondence between the management device identifier and an entry in the registration database, forward, in the SIP format, the system management command to the system component of the computer system; and
receive in the SIP format, the system management response from the system component of the computer system.

11. The SIP proxy device of claim 9, wherein the controller is configured to:
receive presence information related to at least one system component of the computer system, the presence information indicating a status of the at least one system component of the computer system;
transmit, in the SIP format, the presence information to the management device associated with the computer system, the management device having subscribed to the presence information associated with the at least one system component of the computer system; and
when receiving the system management command from the management device, the controller is configured to receive, in the SIP format, the system management command from the management device, the system management command targeted toward a selected system component of the at least one system component, the management device having selected the system component based upon the presence information indicating the status of the selected system component.

12. The SIP proxy device of claim 11, wherein when retrieving presence information related to the at least one system component of the computer system, the presence information indicating a status of the at least one system component of the computer system, the controller is configured to receive dynamic presence information related to at least one system component of the computer system, the dynamic presence information indicating a substantially real-time status of the at least one system component of the computer system.

13. The SIP proxy device claim 9, wherein the controller is configured to:
receive presence information related to at least one system component of the computer system, the presence information including alert information associated with at least one system component of the computer system;

transmit, in the SIP format, the presence information to the management device associated with the computer system, the management device having subscribed to the presence information associated with the at least one system component of the computer system; and when receiving the system management command from the management device, the controller is configured to receive, in the SIP format, the system management command from the management device, the system management command targeted toward a selected system component of the at least one system component, the management device having selected the system component based upon the alert information associated with the presence information of the selected system component.

14. The SIP proxy device of claim 9, wherein when receiving a system management command from a management device, the controller is configured to receive, in the SIP format, the system management command from a mobile management device located at a geographic location external to an enterprise associated with the computer system, the mobile management command configured to manage the system component of the computer system.

15. The SIP proxy device of claim 14, wherein the management device is a smart phone configured to provide both telephonic functionality and computer-associated communication functionality.

16. The SIP proxy device of claim 9, wherein:

when receiving the system management command from the management device the controller is configured to receive, in the SIP format, the system management command from the management device, the system management command configured as an SIP message having a command line interface (CLI) management request; and when providing the system management response to the management device in the SIP format, the controller is configured to provide, in the SIP format, the system management response to the management device, the system management response configured as an SIP message having a CLI management response.

17. A computer program product having a non-transitory computer-readable medium including computer program logic encoded thereon that, when performed on a controller of an SIP proxy device causes the SIP proxy device to:

receive, in a SIP format, a system management command from a management device, the management device configured to manage a system component of the computer system;

confirm an association between the management device and the system component of the computer system; and in response to confirming the association between the management device and the system component of the computer system, provide a system management response to the management device in the SIP format, wherein the SIP proxy device is configured as a first SIP proxy device and in the SIP format, the controller of the first SIP proxy device configured to:

detect a correspondence between the system management command and a second SIP proxy device disposed in electrical communication with the first SIP proxy device, the second SIP proxy device being arranged hierarchically beneath the first SIP proxy device;

transmit, in the SIP format, the system management command to the second SIP proxy device;

receive, in the SIP format, the system management response from the second SIP proxy device; and transmit, in the SIP format, the system management response to the management device.

18. In a Session Initiation Protocol (SIP) proxy device associated with a computer system, a method for providing system management, comprising:

receiving, by the SIP proxy device and in a SIP format, a system management command from a management device, the management device configured to manage a system component of the computer system;

confirming, by the SIP proxy device, an association between the management device and the system component of the computer system; and in response to confirming the association between the management device and the system component of the computer system, providing, by the SIP proxy device, a system management response to the management device in the SIP format;

wherein the SIP proxy device includes a registration database having a set of registration database entries, each registration database entry including a respective management device identity and a corresponding list of system component identifiers to identify a list of system components associated with that management device identity;

wherein the management device is a computerized user device residing at a location remote from the SIP proxy device, the computerized user device having a particular management device identity to distinguish that computerized user device from other computerized user devices;

wherein the SIP proxy device is constructed and arranged to operate as a front end to multiple management devices on behalf of multiple system components of the computer system;

wherein receiving the system management command from the management device includes obtaining (i) the particular management device identity and (ii) a particular system component identifier from the computerized user device residing at the location remote from the SIP proxy device; and wherein confirming, by the SIP proxy device, the association between the management device and the system component of the computer system includes:

finding, in the registration database, a particular registration entry which includes the particular management device identity, and verifying that the particular system component identifier is in the corresponding list of system component identifiers of the particular registration entry to manage access to a particular system component identified by the particular system component identifier.

19. In a Session Initiation Protocol (SIP) proxy device associated with a computer system, a method for providing system management, comprising:

receiving, by the SIP proxy device and in a SIP format, a system management command from a management device, the management device configured to manage a system component of the computer system;

confirming, by the SIP proxy device, an association between the management device and the system component of the computer system; and in response to confirming the association between the management device and the system component of the computer system, providing, by the SIP proxy device, a system management response to the management device in the SIP format;

the method of further including:

physically separating the management device from the SIP proxy device and the system component;

transmitting the system management command from the management device securely to the SIP proxy device;

forwarding the system management command to an indicated system component of the computer system configured to respond to the system management command by at least one of storing a value in a memory location, retrieving a value from a memory location, performing a mathematical operation, performing a logical operation, and incrementing a counter;

transmitting the system response from the system component to the SIP proxy device; and transmitting the system response securely to the management device, the system response including at least one of the result of a memory operation, the result of a mathematical operation, the result of a logical operation and a system status.

* * * * *